3,363,857
SATELLITE CONSTRUCTION
Friedrich Vilbig, Munich-Solln, Germany, assignor to Bolkow Gesellschaft mit Beschrankter Haftung, Ottobrunn, near Munich, Germany
Filed Oct. 21, 1966, Ser. No. 588,452
Claims priority, application Germany, Oct. 29, 1965, B 84,295
9 Claims. (Cl. 244—1)

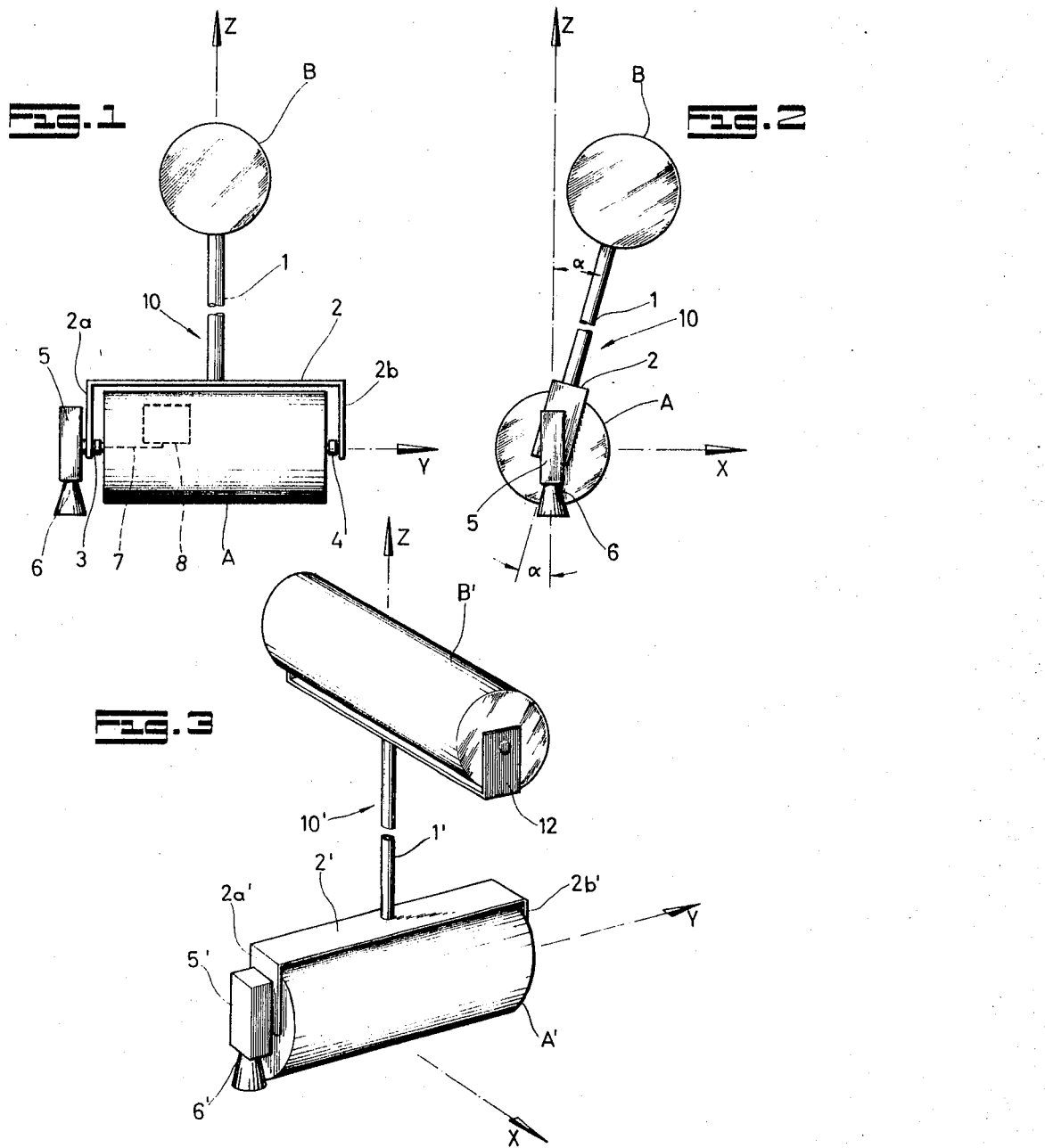

This invention relates, in general, to satellite constructions and to a new and useful satellite having a directional radio system with means for orienting the antenna thereof in the direction of the earth during orbit.

Due to the small amount of available transmitting energy, the exchange of a communication between a satellite and its earth-bound ground station requires as accurate as possible a focusing of the directional radio antenna on the particular ground station ready to receive. The directional radio antenna of a communication satellite must therefore be maintained continuously focused on the center of the earth.

It has been known to design communication satellites as drum or ball-shaped bodies and to arrange at their circumference dipole-type emitters which act as antennas in order to insure advantageous radio communication. On their orbit around the earth they are spin stabilized, that is, they rotate about their longitudinal axis which is oriented perpendicular to the orbit plane. During the rotation of the communication satellite only the emitter which is arranged at the location on the circumference thereof which points toward the center of the earth is switched on at any given moment. In this manner, a radiation lobe directed toward the earth is obtained although only with a relatively small antenna gain. However, the switching of the emitters which may be controlled, for example, by earth sensors requires a rather great expenditure for electrical and/or mechanical switching units which are, of course, subject to trouble in operation. A further disadvantage is that when the switching device does not function exactly, the spin frequency appears on the effective signal as an interference modulation.

Horn or parabola antennas exhibit a greater antenna gain than dipole-type emitters but because of their great directivity they must be focused very exactly on the center of the earth. For a spin stabilized satellite body, that is, those revolving about an axis of rotation, such focusing is not feasible or only feasible if the orbit of the satellite is so selected that its spin axis always points to the center of the earth. This is not practical for reasons of orbit mechanics and the requirement for energy supply from the solar cells.

It has been suggested that the satellites be stabilized on their orbit in a defined position relative to the center of the earth with the utilization of a gravity field of the earth. For such a position stabilization, the satellite body must be divided into two bodies which are separated from each other by a bar so that the resultant structure is in the configuration of a dumbbell. Under the influence of the earth's gravitational gradient field, the dumbbell axis adjusts itself in the direction of the center of the earth. A horn or parabola antenna secured to the satellite body then always points with its main radiation direction toward the center of the earth. However, due to low restoring force of the earth's gravitation field, this arrangement tends to swing like a pendulum which tendency can be reduced by suitable damping arrangements at the satellite.

In contrast to spin stabilized satellites, where the stabilization acts independently of the height of the orbit, this arrangement is useful only for relatively low satellite heights due to the fact that the restoring force of the earth's gravitational field sharply decreases with the distance from the earth.

An active position stabilization of communication satellites may be carried out by means of small rocket engines so that directional antennas can be employed. However, the life of such a communication satellite is too limited due to the limitations on the fuel supply. Control engines have therefore been used so far only for steering satellites into their particular desired orbit and for any orbit corrections which may be necessary to maintain the desired orbit.

In accordance with the invention, there is provided a communications satellite which includes at least one directional radio antenna which may be either a horn or parabola antenna and which may be stabilized without fuel consuming rocket engines in its ascending position even at great heights of an orbit around the earth so that the directional radio antenna will always be focused on the center of the earth. In accordance with a feature of the invention, the satellite is constructed in the general configuration of a dumbbell including two body portions which are interconnected by a bar portion with at least one of the bodies being rotatably mounted at one end of the dumbbell bar about an axis of rotation arranged perpendicular to the longitudinal axis of the dumbbell and with the directional radio antenna being located on the bar at the end facing the center of the earth. With such a construction, the earth gravitation will cause the dumbbell-shaped satellite to be fixed in relation to its longitudinal axis so that of the six degrees of freedom which the satellite presents like any other arrangement composed of two masses only four remain. Because of the weak restoring force of the earth's gravitational field, such a dumbbell-shaped satellite can execute pendulum movements, which presents four remaining degrees of freedom. If one body of the dumbbell is designed as a rotatable body, the entire arrangement is spin stabilized in relation to this axis of rotation. If the axis of rotation of the spin stabilized body is arranged normal to the longitudinal axis of the dumbbell, two additional degrees of freedom are fixed and the complete structure can only swing back and forth within one plane.

In a preferred embodiment of the invention, one body is mounted rotatably on a strap or U-shaped stirrup which is firmly connected with one end of the dumbbell bar. A directional radio antenna is secured to the strap in a manner permitting the position thereof to be controlled through earth sensors which continuously supervise the position of the communication satellite so that the antenna may be pivoted counter to any pendulum movement of the satellite. By such a spin stabilization, the pendulum movement of a gravity stabilized satellite is limited to two degrees of freedom, and the change of position of the satellite is thus easier to accomplish and is compensated for by re-adjustment of the antenna counter to this movement. In this manner, the directional radio antenna remains focused with its main radiation direction to the center of the earth.

If the second body of the dumbbell bar construction is also mounted rotatably, and its axis of rotation selected normal to the longitudinal axis of the dumbbell and normal to the axis of the first body, then the communication satellite becomes fixed in its position in respect to the earth. It thus no longer possesses any degree of freedom because after the second body is arranged in the rotating manner indicates, the remaining two degrees of freedom become fixed. In such an arrangement, the directional radio antenna is firmly connected with either the dumbbell bar or one of the straps supporting the rotating body and it is continuously focused with its main radiation directed on the center of the earth. The position of the satellite in relation to the earth will become fixed after attainment of its predetermined orbit. In order that the spin rotation of the body is not braked by frictional losses at the axle mounting, a magnetic axle mounting is preferably provided.

Accordingly, it is an object of the invention to provide a satellite having a directional radio system which includes an antenna with means for directing the antenna toward the earth during the orbit of the satellite.

A further object of the invention is to provide a satellite construction of a substantially dumbbell configuration which includes first and second bodies which are separated by a bar member, with at least one of the bodies being rotatable about its longitudinal axis which is normal to the bar member so as to be spin stabilized, and wtih a directional radio antenna arranged at one end of the bar member in a manner so that it can be oriented downwardly toward the earth.

A further object of the invention is to provide a satellite construction which includes a spin stabilized cylindrical body portion at each end of a connection bar with a radio transmitting system which includes an antenna which is fixed at the end of the bar so as to be oriented continuously toward the earth.

A further object of the invention is to provide a satellite construction which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a front elevational view of a satellite constructed in accordance wtih the invention;

FIG. 2 is a side elevational view of the satellite of FIG. 1; and

FIG. 3 is a perspective view of another embodiment of the invention.

Referring to the drawings in particular, the invention embodied therein as indicated in FIGS. 1 and 2 comprises a satellite generally designated 10 which includes a central bar member 1 with a body A connected to one end of the bar member and a body B connected to the other end to form the general configuration of a dumbbell. In this embodiment, the body A is spin stabilized and is mounted on a strap or stirrup 2 to permit its rotation about its longitudinal axis, that is, the Y axis as indicated in the drawings. In order to facilitate the easy and frictionless rotation of the body A, the body is supported in magnetic bearings 3 and 4 which are carried at respective end arms 2a and 2b of the stirrup 2. The body A carries a radio transmitting system which includes a directional antenna such as a horn antenna which includes a cavity resonator 5 and a horn emitter 6. The cavity resonator is energized through a coupling conductor 7 from a transmitter 8 which is located in the interior of the body A. The energy is radiated from the resonator 5 through the emitter 6 and a directional beam extending parallel to the axis of the bar 1 or the Z-axis as indicated in FIG. 1.

In the simplest case, the satellite 10 will be focused by the action of the earth's gravitation gradient so that the longitudinal axis of the dumbbell bar 1 will coincide with the Z-axis which passes through the center of the earth. The satellite will be steered in its orbit so that the body A will be nearest to earth and will carry the horn emitter 6 which will be focused with its main radiation directed on the center of the earth.

Due to the load directing force which may be obtained from the earth's gravitational gradient, it is likely that some pendulum movements of the satellite 10 will take place during the revolution thereof around the earth. Such movements are produced, for example, by influences of the gravitation of the sun and the moon, by fluctuation of the earth's gravitation field, by the photo pressure varying during satellite revolution and by striking meteors and the like. Because of this slight directing effect, the oscillation duration of the pendulum movements will be relatively long. Because the entire satellite arrangement is spin stabilized by the rotation of the body A, the arrangement can execute only pendulum or nodding movements in the X–Z plane. Thus, when the body B at the end of the bar causes the pendulum movement in the X–Z plane about an angle $\alpha$, then the directional beam of the horn emitter 6 will be correspondingly shifted by the same angle, but in a contrary direction to the pendulum movement. In some instances, it is desirable to mount the horn resonator 5 so that it will be rotatable at the end of the strap arm 2a so that it can be controlled automatically, for example, by earth sensors (not shown). Because it is possible to re-adjust the position of the horn in accordance with the pendulum movements which may take place, it is possible to insure that the antenna is exactly focused on the center of the earth when the earth's gravitational gradient field becomes too weak to effect the automatic stability of the satellite. The deviation velocity with which the pendulum movement will take place is so small that the time constant is great enough to be able to re-set the cavity resonator 5 with the horn emitter 6 in the direction of the center of the earth without any difficulty. The arrangement thus has the advantage that the focusing of the antenna is independent of the flying height of the satellite where the gravitational influence is less and, in addition, the antenna need be pivoted only in a single plane.

As indicated in FIG. 3, it is possible to also mount the body B' so that it is spin stabilized by mounting the body B' on a yoke member 12 which is carried at one end of the bar member 1'. A yoke or strap 2' is also carried at the opposite end and rotatably supports the body A' as in the first embodiment. In the construction of FIG. 3, the axis of rotation for the body B' is perpendicular to the axis of rotation of the body A' and perpendicular to the longitudinal axis of the bar 1' so that the entire arrangement is stabilized not only in relation to the Y-axis but also in relation to the X-axis.

With the embodiment indicated in FIG. 3, the satellite 10' has no longer any degree of freedom apart from orbit deviations due to external influences. The position of the satellite 10' in relation to the center of the earth will become fixed so that the horn emitter 6' may be always oriented so that it is directed downwardly to the center of the earth. With the embodiment of FIG. 3, it is not necessary to provide any adjustment of the horn emitter during the operation.

While specific embodiments of the invention have been shown and described in detail to illustrate the application of the inventive principles, it will be understood that the invention may be embodied otherwise without departing from such principles.

What is claimed is:

1. A communication satellite comprising a central bar, a first body carried at one end of said bar, a second body, means rotatably supporting said second body adjacent the opposite end of said bar for spin stabilizing rotation about its axis, which axis is arranged perpendicular to the axis of said bar, and a directional radio antenna carried by said bar adjacent the end which will be oriented toward the earth and arranged to be directed toward the center of the earth.

2. A communication satellite, according to claim 1, including means for supporting said first body for rotation perpendicular to the axis of rotation of said second body and perpendicular to the axis of said bar.

3. A communication satellite according to claim 2, wherein said first and second bodies are substantially cylindrical.

4. A communication satellite, according to claim 1, wherein said means rotatably supporting said body includes magnetic bearings.

5. A communication satellite according to claim 1, wherein said means rotatably supporting said second body includes a strap member connected to one end of said bar and having a leg portion at each end, and magnetic bearing means on each of said leg portions rotatably supporting said second body.

6. A communication satellite according to claim 5, wherein said directional radio antenna includes a resonator mounted on said strap and an emitter extending outwardly from one end of said resonator oriented toward the earth.

7. A communication satellite, according to claim 6, including means for mounting said resonator on said strap for pivotal movement.

8. A communication satellite according to claim 1, including means rotatably supporting said first body for rotation about an axis substantially perpendicular to the axis of said second body, said means for rotatably supporting said second body including a strap member having outwardly extending leg portions at each end, said directional radio antenna including a resonator having an emitter connected thereto extending downwardly toward the earth, and means for fixing said resonator to one of said strap legs.

9. A communication satellite according to claim 1, wherein said second body is substantially drum-shaped.

No references cited.

RODNEY D. BENNETT, *Primary Examiner.*

T. H. TUBBESING, *Assistant Examiner.*